United States Patent

Hoffmann et al.

[11] Patent Number: 6,121,715
[45] Date of Patent: Sep. 19, 2000

[54] METHOD AND DEVICE FOR DRIVING A CAPACITIVE CONTROL ELEMENT

[75] Inventors: Christian Hoffmann, Regensburg; Hellmut Freudenberg, Grossberg; Hartmut Gerken, Nittendorf; Martin Hecker, Laimerstadt; Richard Pirkl, Regensburg, all of Germany

[73] Assignee: Siemens Aktiengesellschaft, Munich, Germany

[21] Appl. No.: 09/335,562

[22] Filed: Jun. 18, 1999

Related U.S. Application Data

[63] Continuation of application No. PCT/DE97/02906, Dec. 12, 1997.

[30] Foreign Application Priority Data

Dec. 18, 1996 [DE] Germany .......................... 196 52 801

[51] Int. Cl.[7] .................................................. H01L 41/08
[52] U.S. Cl. ....................................................... 310/316.03
[58] Field of Search .............................. 310/316.03, 317

[56] References Cited

U.S. PATENT DOCUMENTS

| | | |
|---|---|---|
| 4,732,129 | 3/1988 | Takigawa et al. . |
| 4,767,959 | 8/1988 | Sakakibara et al. . |
| 4,841,936 | 6/1989 | Takahashi . |
| 5,036,263 | 7/1991 | Yamada et al. . |
| 5,130,598 | 7/1992 | Verheyen et al. . |
| 5,387,834 | 2/1995 | Suzuki . |
| 5,477,831 | 12/1995 | Akaki et al. . |
| 5,543,679 | 8/1996 | Morino et al. . |
| 5,986,360 | 11/1999 | Gerken et al. . |
| 6,016,040 | 1/2000 | Hoffmann et al. . |

FOREIGN PATENT DOCUMENTS

| | | |
|---|---|---|
| 2 760 489 A1 | 9/1998 | France . |
| 196 32 871 A1 | 2/1998 | Germany . |
| 197 23 935 C1 | 12/1998 | Germany . |
| 98/55750 | 12/1998 | WIPO . |

OTHER PUBLICATIONS

Japanese Patent Abstract No. 61271881 (Mashahiro), dated Dec. 2, 1986.
Japanese Patent Abstract No. 62210241 (Yasuyuki), dated Sep. 16, 1987.
Japanese Patent Abstract No. 06140682 (Motoyuki), dated May 20, 1994.

*Primary Examiner*—Nestor Ramirez
*Assistant Examiner*—Peter Medley
*Attorney, Agent, or Firm*—Herbert L. Lerner; Laurence A. Greenberg; Werner H. Stemer

[57] ABSTRACT

A capacitive control element is charged with a defined charging voltage Uc. From a stored mapping KF, the instantaneous control element capacitance Cp is determined from the charge voltage Uc and a control element voltage Up. In addition, energy E supplied to the control element is determined from the charge voltage Uc and the control element capacitance Cp. According to a deviation of energy E fed to the control element from a stipulated amount of energy Ev, the charge voltage Uc for a next drive process of the control element is regulated. The same process occurs for additional control elements.

12 Claims, 3 Drawing Sheets

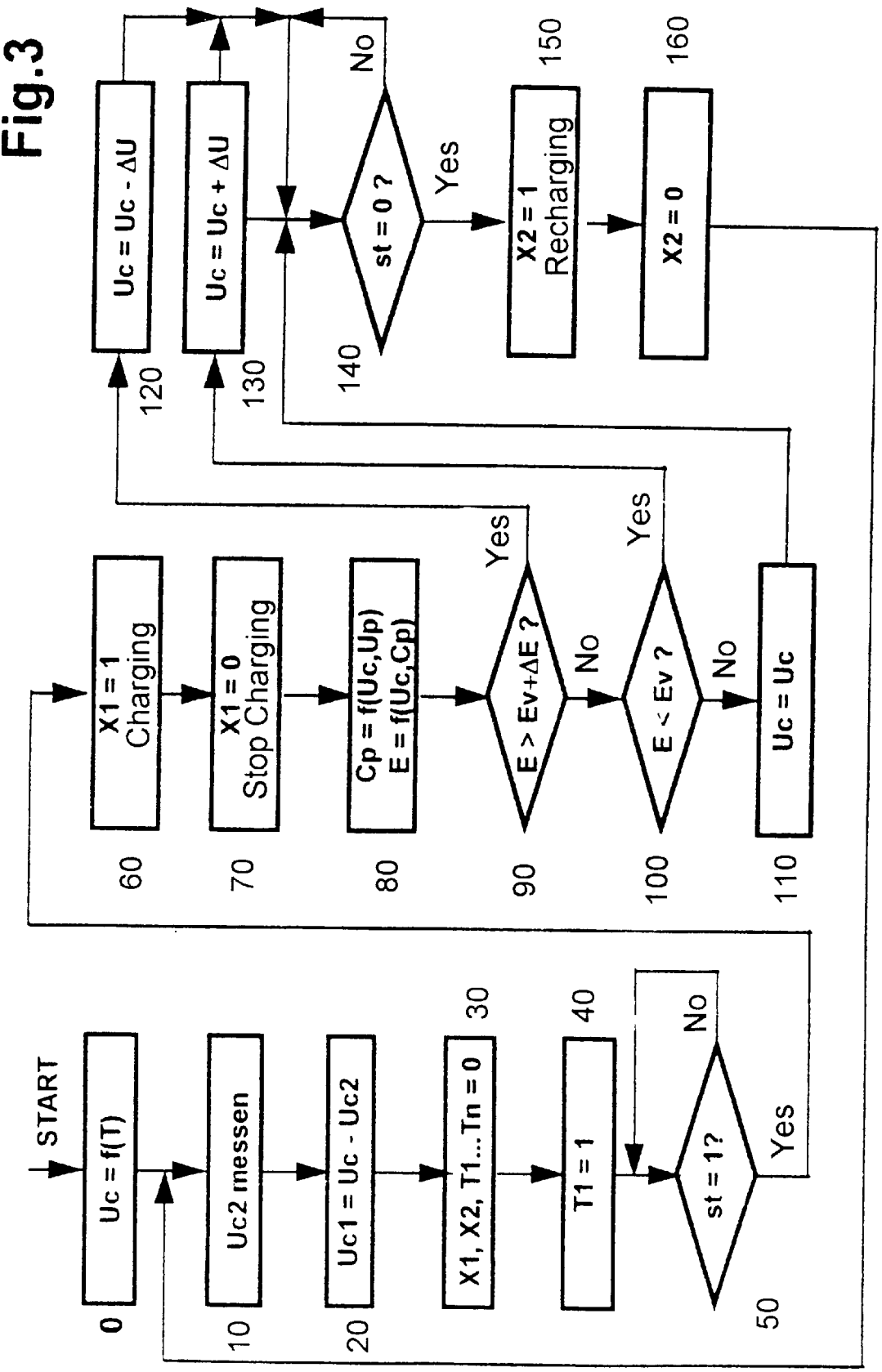

METHOD AND DEVICE FOR DRIVING A CAPACITIVE CONTROL ELEMENT

CROSS-REFERENCE TO RELATED APPLICATION

This application is a continuation of copending International Application No. PCT/DE97/02906, filed Dec. 12, 1997, which designated the United States.

BACKGROUND OF THE INVENTION

Field of the Invention

The invention concerns a method and device for driving a capacitive control element, especially a piezoelectrically operated fuel injection valve of an internal combustion engine.

Piezo control elements consist of a number of piezoceramic layers and form a so-called "stack", which changes its dimensions when a voltage is applied, especially its length s by a deviation ds, or generates an electrical voltage during mechanical compression or tension.

The electrical properties of this type of piezostack vary with the temperature to which it is exposed. With increasing temperature, its capacitance is increased, but so is the deviation. At the temperatures to be considered for automotive applications of about −40° C. to +140° C., changes of up to a factor of 2 are observed.

A drive circuit for a piezoelectric element of a matrix printer is known from U.S. Pat. No. 5,387,834, in which a temperature sensor senses the temperature of the piezoelectric element. Driving of the piezoelectric element occurs with charging times that are stored in a table as a function of the temperature.

The deviation varies roughly linearly with the applied voltage at a specified control element capacitance or a specified temperature. If the temperature varies, so does the deviation at equal voltage. On the other hand, the deviation varies in proportion to the square of the applied energy (ds~$e^2$), but independently of the temperature. It is very complicated to supply a specified amount of energy to a control element.

SUMMARY OF THE INVENTION

It is accordingly an object of the invention to provide a method and a device for driving a capacitive control element which overcomes the above-mentioned disadvantages of the prior art methods and devices of this general type.

With the foregoing and other objects in view there is provided, in accordance with the invention, a process for driving at least one capacitive control element, including a piezoelectrically operated fuel injection valve of an internal combustion engine, with an assignable amount of energy, which includes:

charging, at a beginning of a drive process, a control element of a plurality of control elements, via an oscillation coil from a series circuit having a charging voltage and formed of a charging capacitor and a recharging capacitor, and discharging the control element at an end of the drive process to the recharging capacitor;

determining a temperature-dependent capacitance value of the control element from the charging voltage and a control element voltage derived from the charging voltage;

determining a supplied amount of energy fed to the control element from the temperature-dependent capacitance value and the charging voltage;

determining the charge voltage for a next drive process of the control element dependent on a difference between a stipulated amount of energy and the supplied amount of energy; and charging the charging capacitor to a voltage corresponding to a difference between the charge voltage and a further voltage lying instantaneously on the recharging capacitor.

It is the task of the invention to provide a method for driving a capacitive control element with a stipulated amount of energy that is simple to execute. The task of the invention is also to devise an apparatus for execution of the method.

With the foregoing and other objects in view there is further provided, in accordance with the invention, a device for driving at least one capacitive control element, including:

a controllable voltage source having a plus pole and a minus pole;

a charging capacitor is disposed between the plus pole and the minus pole of the controllable voltage source;

a first series circuit is disposed parallel to the charging capacitor and contains a charging switch connected to the plus pole for conducting current away from the plus pole and a discharge switch connected to the minus pole for conducting current toward the minus pole;

a ground terminal;

a second series circuit is disposed between a connection point of the charging switch and the discharge switch and the ground terminal, the second series circuit contains a recharging capacitor having a recharge voltage connected to the charging switch and an oscillating coil;

at least one third series circuit is connected in series with the second series circuit and contains a control element having a control element voltage and a controlled Power-MOSFET-switch;

a diode is disposed parallel to the at least one third series circuit and conducts from the ground terminal to the oscillating coil; and a control circuit stores a mapping, the control circuit controlling the charging switch, the discharge switch and the Power-MOSFET-switch, the control circuit determining an amount of energy to be transferred to the control element in dependence on a control signal fed to the control circuit for driving the control element, the control element voltage lying on the control element to be driven, the recharge voltage lying on the recharging capacitor, and the mapping, and, depending on a difference between an amount of energy actually transferred to the control element and a desired stipulated amount of energy, the control circuit adjusting the controllable voltage source to a charging voltage of the charging capacitor for a next charging process.

Other features which are considered as characteristic for the invention are set forth in the appended claims.

Although the invention is illustrated and described herein as embodied in a method and a device for driving a capacitive control element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a flow chart for a method of operation of the circuit according to FIG. 2.

DESCRIPTION OF THE PREFERRED EMBODIMENTS

Figure 1:
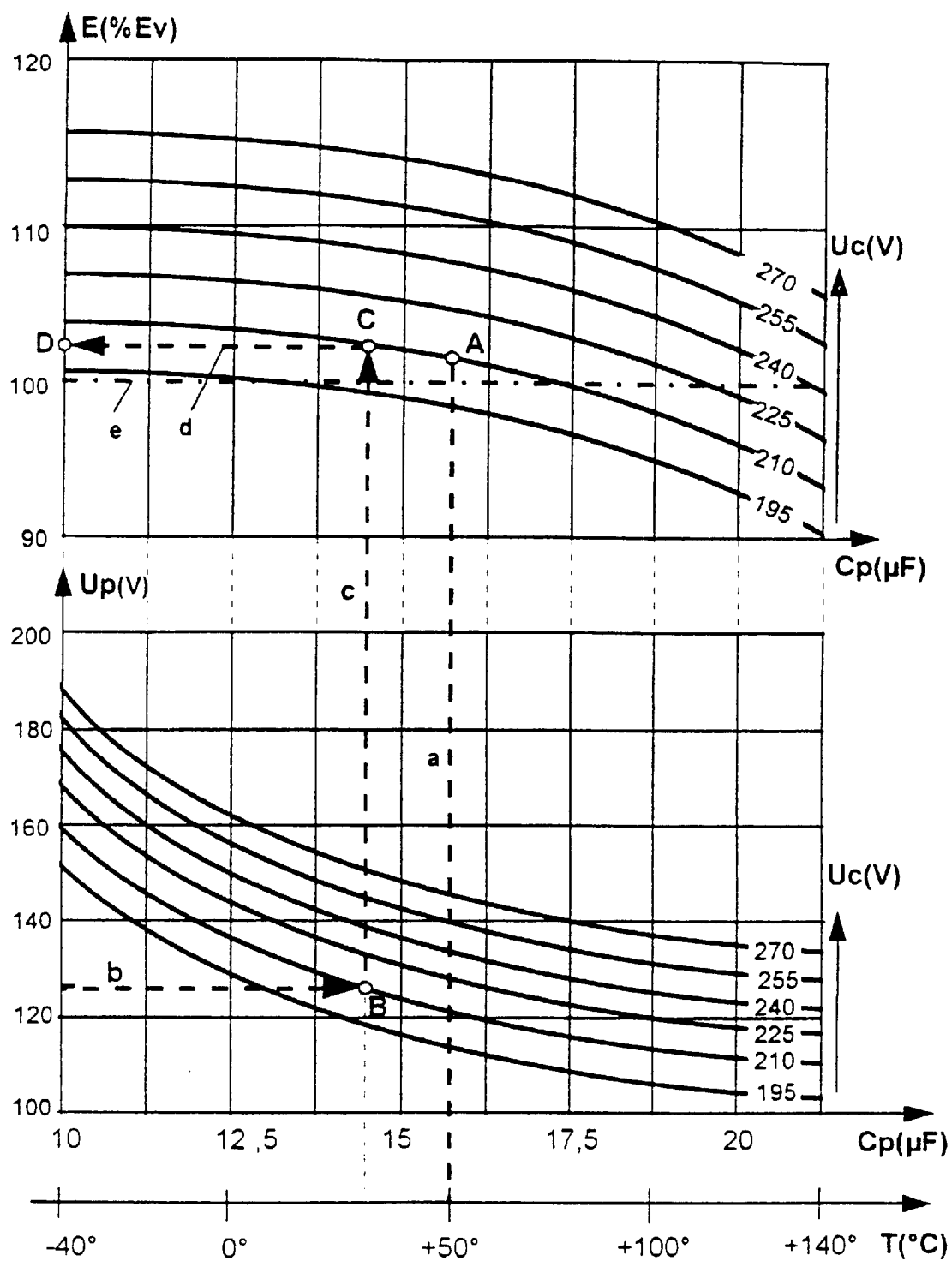
FIG. 1 is a diagrammatic, mapping KF showing a relation between control element capacitance Cp, charge voltage Uc, control element voltage Up and energy E.

The invention starts from the consideration that the changes in control element capacitance Cp are temperature-related changes that exhibit very large time constants relative to the timing of successive control element activations in an internal combustion engine. It is therefore not necessary to execute control of charging in a control cycle (drive process) itself. It is fully sufficient to establish a control deviation in a drive process and to correct this control deviation in the subsequent drive process.

In all the figures of the drawing, sub-features and integral parts that correspond to one another bear the same reference symbol in each case. Referring now to the figures of the drawing in detail and first, particularly, to FIG. 1 thereof, there is shown a mapping with two experimentally determined or calculated diagrams representing the relation between a control element capacitance Cp, a charging voltage Uc, a control element voltage Up and energy E. The upper diagram shows the attainable energy E in the control element for different charge voltages Uc versus the temperature-dependent control element capacitance Cp (T and Cp plotted on the abscissa), whereas the lower diagram also shows the control element voltage Up attainable for these charge voltages Uc versus the temperature-dependent control element capacitance Cp on the abscissa.

An intrinsic mapping KF can be prescribed for each control element P1 to Pn, but a common mapping KF can also be prescribed for all control elements or for each control element group.

By considering the charge voltage Uc and the control element voltage Up achieved with it, current measurement, multiplication and integration, as described above, can be dispensed with. Based on the clear relation between the mentioned quantities, control can be carried out at roughly constant energy Ev. A value Ev related to 100% Ev is shown in FIG. 1 as a dash-dot line e.

Control at a constant energy level is especially important when the capacitance Cc of a charging capacitor C deviates significantly from the control element capacitance Cp. The diagrams depicted in FIG. 1 correspond to a circuit according to FIG. 2, in which the capacitance Cc of a series circuit, consisting of capacitors C1 and C2, is about half as large as the capacitance Cp of the control element P:Cc=Cp/2.

Figure 2:
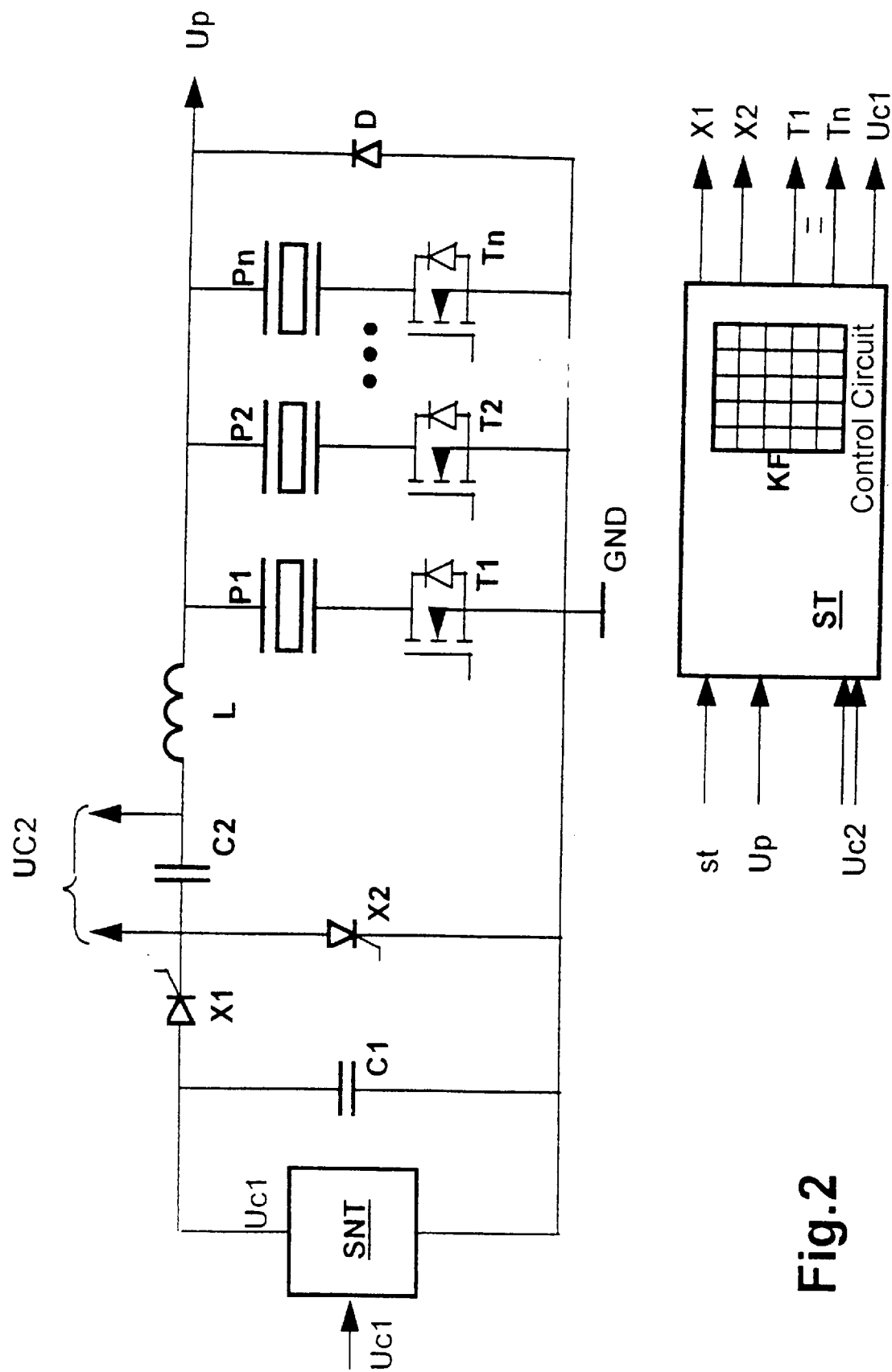
FIG. 2 is a circuit diagram of a drive circuit for several control elements.

The method according to the invention is described further with reference to a circuit depicted in FIG. 2. Driving of n fuel injection valves (not further shown) of an internal combustion engine via the piezoelectric control elements P1 to Pn occurs by a control circuit ST, which is part of a microprocessor-controlled engine control system (not further shown).

The charging capacitor C1 is connected between plus pole +Uc1 and minus pole GND of a controllable voltage source SNT, preferably of a logic circuit part, which can be viewed as the output capacitor of the logic circuit part SNT and is charged to its output voltage Uc1. Parallel to the charging capacitor C1, a series circuit consisting of a charging switch X1, connected to the plus pole and conducting current away from it, and of a discharge switch X2 conducting current toward it and connected to the minus pole GND is disposed.

The switches X1 and X2 are electronic switches that conduct in only one direction and consist of at least one semiconductor element, preferably thyristor switches that are made conducting by the control circuit ST.

A series circuit consisting of the recharging capacitor C2, an oscillation coil L, a first control element P1 and a first controlled Power-MOSFET-switch T1 lies between the connection point of the charging switch X1 and the discharge switch X2 and a ground terminal GND.

For each additional control element P2 to Pn, a series circuit consisting of the control element P2 to Pn and an additional Power-MOSFET-switch T2 to Tn is connected in parallel to the series circuit consisting of the first control element P1 and the first Power-MOSFET-switch T1.

A diode D that conducts current away from the ground terminal GND toward the oscillation coil L is disposed parallel to the series circuits consisting of the control element P1-Pn and the Power-MOSFET-switch T1-Tn. Power-MOSFET-switches ordinarily contain inverse diodes, whose function, as explained further below, is used during operation of the device according to the invention.

The switches X1, X2 and T1 to Tn are controlled by the control circuit ST according to a program of the method according to the invention, as a function of control signals st, the achieved control element voltage Up and the actual value Uc2 of the voltage on the recharging capacitor C2 after discharge of the control element P1-Pn with reference to a mapping KF according to FIG. 1 stored in the control circuit ST.

The method according to the invention for sequential driving of several capacitive control elements P1-Pn is further illustrated below with reference to the flow chart depicted in FIG. 3 based on the circuit shown in FIG. 2 for the control element P1. The individual boxes allocated to the corresponding process states are marked with reference numerals.

In a state 30 (during operation), in which the oscillation coil L is currentless, all of the switches X1, X2 and T1 to Tn are nonconducting (high-resistance) and all of the control elements P1 to Pn are discharged. The control element P1 is to be activated in order to inject fuel into a first cylinder via the connected injection valve. The charging voltage Uc=Uc1+Uc2 is preassigned in a first drive process during startup of the vehicle, state 0.

During the first drive process, the recharging capacitor C2 is discharged. A transient process occurs that can last for one or more charging cycles until the voltage Uc2 on the recharge capacitor C2 fed back during discharge of the control element P1 reaches a value of Uc2>+100 V after each discharge process. The maximum charging voltage Ucmax=Uc1+Uc2 should amount to +270 V, for example.

The control circuit ST initially chooses the corresponding control element (here P1), state 60, in which it brings the Power-MOSFET-switch T1 connected to it to the conducting state. T1 can remain conducting (low-resistance) over a crank angle CA=720° CA/N (N=number of cylinders), for example, 180° CA in four cylinder engines and 120° CA in six cylinder engines.

In the first drive process the control circuit ST chooses a stored, experimentally determined or calculated characteristic of the charging voltage Uc (+210 V) in the upper diagram of the mapping KF in FIG. 1, which lies above a desired energy Ev to be fed to the control element P1 (marked in the diagram by a dash-dot line e), state 0, at the capacitance value of the control element P corresponding to the instantaneous control element temperature. Since the control element temperatures are generally not available, an engine temperature T (in the practical example +50° C.) can be referred to as substitute quantity, see dashed line a up to point A in FIG. 1, in order to obtain an approximate value for the instantaneous control element capacitance Cp.

In a simpler variant an initial value for the charging voltage Uc (for example, +210 V) can be simply stipulated independently of the temperature.

After one or more drive processes (transient processes) of the control element P1, the voltage of the recharging capacitor C2 after the end of a discharge process is Uc2=+120 V.

At the next beginning of injection, which is stipulated by the beginning of a control signal st=1 (state 50), the charging switch X1 is triggered by the control circuit ST (state 60). The charging voltage Uc=+210 V applied to the series circuit consisting of C1 and C2 is discharged during a complete sine half-oscillation via the oscillation coil L to the control element P1 and this opens the injection valve (not shown). The voltage source (logic circuit part SNT) remains connected to the charging capacitor Cl, so that it also supplies energy to the oscillating circuit.

After recharging, the charging switch X1 deactivates by itself (state 70), the control element P1 is charged, for example, to Up=+126 V.

The value of the control element voltage Up=+126 V is sent to the control circuit ST, which determines the energy supplied to the control element P1 in the mapping KF (FIG. 1) from Uc=+210 V and Up=+126 V (state 80). For this purpose, in the lower diagram of the mapping KF at intersection point B (Uc=−210 V; Up=+126 V, dashed line b) the instantaneous capacitance value Cp≈14.5 µF of the control element P1 is determined, and then in the upper diagram (intersection point C of Cp=14.5 µF; Uc=+210 V, dashed line c) the supplied energy at E≈102.5% Ev (dashed line d; point D) is interpreted.

According to the "sensitivity" of control, this value lies either within a tolerance band Ev+ΔE of the desired energy (state 110), in which the next drive process is conducted with unaltered charging voltage Uc=+210 V, or a new value for the charging voltage Uc is determined for the next drive process of the control element P1, in this practical example, because E>Ev+ΔE is somewhat greater than the desired value (state 90), for example, interpolated from stipulated stored support values, or reduced incrementally by ΔU=5 V (state 120), fixed at +205 V. This value then gives in the next drive process of the control element P1, provided the control element capacitance Cp is the same, approximately a value for the transferred energy of E=Ev. However, if the transferred energy is smaller, E<Ev (state 100), Uc in the next drive process is increased by ΔU=5 V to Uc=+215 V (state 130).

At control element voltages Up above a stipulated maximum value Upmax (for example, +160 V), a pure voltage control preferably occurs according to the lower diagram of FIG. 1, in order to limit the control element voltage Up to this value.

For discharging of the control element P1 at the end of the control signal st (stage 140), the discharge switch X2 is triggered (state 150). The discharge current circuit is closed via the inverse diode of the Power-MOSFET-switch T1. The energy stored in the control element P1 oscillates back to the capacitor C2 via the oscillation coil L, which is charged to the already mentioned value Uc2=+120 V; the energy stored in the discharge capacitor C2 can be used for the next cycle.

As soon as the control element P1 is discharged to the threshold voltage of the diode D lying parallel to the "active" channel, the still flowing current continues through the diode, so that charging of the control element P1 to a negative voltage is prevented. The discharge switch X2 then deactivates by itself (state 160).

For the next drive process of the control element P1, the charging capacitor C1 must be charged to a voltage Uc1=Uc Uc−Uc2, for which Uc2=+120 V is measured (state 10). Uc1=Uc−Uc2=+205 V−120 V=+85 V can thus be determined (state 20). The logic circuit part SNT is set to this value for the next drive process of control element P1 and the charging capacitor C1 is thus charged to Uc1=+85 V. The next drive process from state 30 is conducted with these values determined in this drive process. The drive processes for the other control elements P2 to Pn correspond to the described process for control element P1.

We claim:

1. A process for driving at least one capacitive control element, including a piezoelectrically operated fuel injection valve of an internal combustion engine, with an assignable amount of energy, which comprises:

charging, at a beginning of a drive process, a control element of a plurality of control elements, via an oscillation coil from a series circuit having a charging voltage and formed of a charging capacitor and a recharging capacitor, and discharging the control element at an end of the drive process to the recharging capacitor;

determining a temperature-dependent capacitance value of the control element from the charging voltage and a control element voltage derived from the charging voltage;

determining a supplied amount of energy fed to the control element from the temperature-dependent capacitance value and the charging voltage;

determining the charge voltage for a next drive process of the control element dependent on a difference between a stipulated amount of energy and the supplied amount of energy; and charging the charging capacitor to a voltage corresponding to a difference between the charge voltage and a further voltage lying instantaneously on the recharging capacitor.

2. The process according to claim 1, which comprises permanently storing the temperature-dependent capacitance value, the supplied amount of energy fed to the control element, and the stipulated amount of energy to be fed to the control element as one of experimentally determined and calculated values in a mapping.

3. The process according to claim 2, which comprises providing each of the plurality of control elements with an individual mapping.

4. The process according to claim 2, which comprises providing the mapping as a common mapping for all of the plurality of control elements.

5. The process according to claim 2, which comprises grouping the plurality of control elements into groups and providing each of the groups with an individual mapping.

6. The process according to claim 1, which comprises stipulating a value for the charging voltage at a beginning of operation of a first drive process of the control element.

7. The process according to claim 6, which comprises deriving the value for the charging voltage dependent on an engine temperature.

8. The process according to claim 1, which comprises stipulating a maximum value for the control element voltage and that an absolute voltage control occurs at the control element voltage above the maximum value.

9. A device for driving at least one capacitive control element, comprising:

a controllable voltage source having a plus pole and a minus pole;

a charging capacitor disposed between said plus pole and said minus pole of said controllable voltage source;

a first series circuit disposed parallel to said charging capacitor and containing a charging switch connected to said plus pole for conducting current away from said plus pole and a discharge switch connected to said minus pole for conducting current toward said minus pole;

a ground terminal;

a second series circuit disposed between a connection point of said charging switch and said discharge switch and said ground terminal, said second series circuit containing a recharging capacitor having a recharge voltage connected to said charging switch and an oscillating coil;

at least one third series circuit connected in series with said second series circuit and containing a control element having a control element voltage and a controlled Power-MOSFET-switch;

a diode disposed parallel to said at least one third series circuit and conducting from said ground terminal to said oscillating coil; and a control circuit storing a mapping, said control circuit controlling said charging switch, said discharge switch and said Power-MOSFET-switch, said control circuit determining an amount of energy to be transferred to said control element in dependence on a control signal fed to said control circuit for driving said control element, said control element voltage lying on said control element to be driven, said recharge voltage lying on said recharging capacitor, and said mapping, and, depending on a difference between an amount of energy actually transferred to said control element and a desired stipulated amount of energy, said control circuit adjusting said controllable voltage source to a charging voltage of said charging capacitor for a next charging process.

10. The device according to claim 9, wherein said controllable voltage source is a logic circuit part controlled by said control circuit.

11. The device according to claim 9, wherein said charging switch and said discharge switch are controlled, electronic semiconductor switches that conduct in only one direction.

12. The device according to claim 9, wherein said at least one third series circuit is a plurality of third series circuits disposed parallel to each other and all in series with said second series circuit.

* * * * *